H. B. GARMAN.
DRAG LINK.
APPLICATION FILED OCT. 16, 1919.
1,410,908.
Patented Mar. 28, 1922.
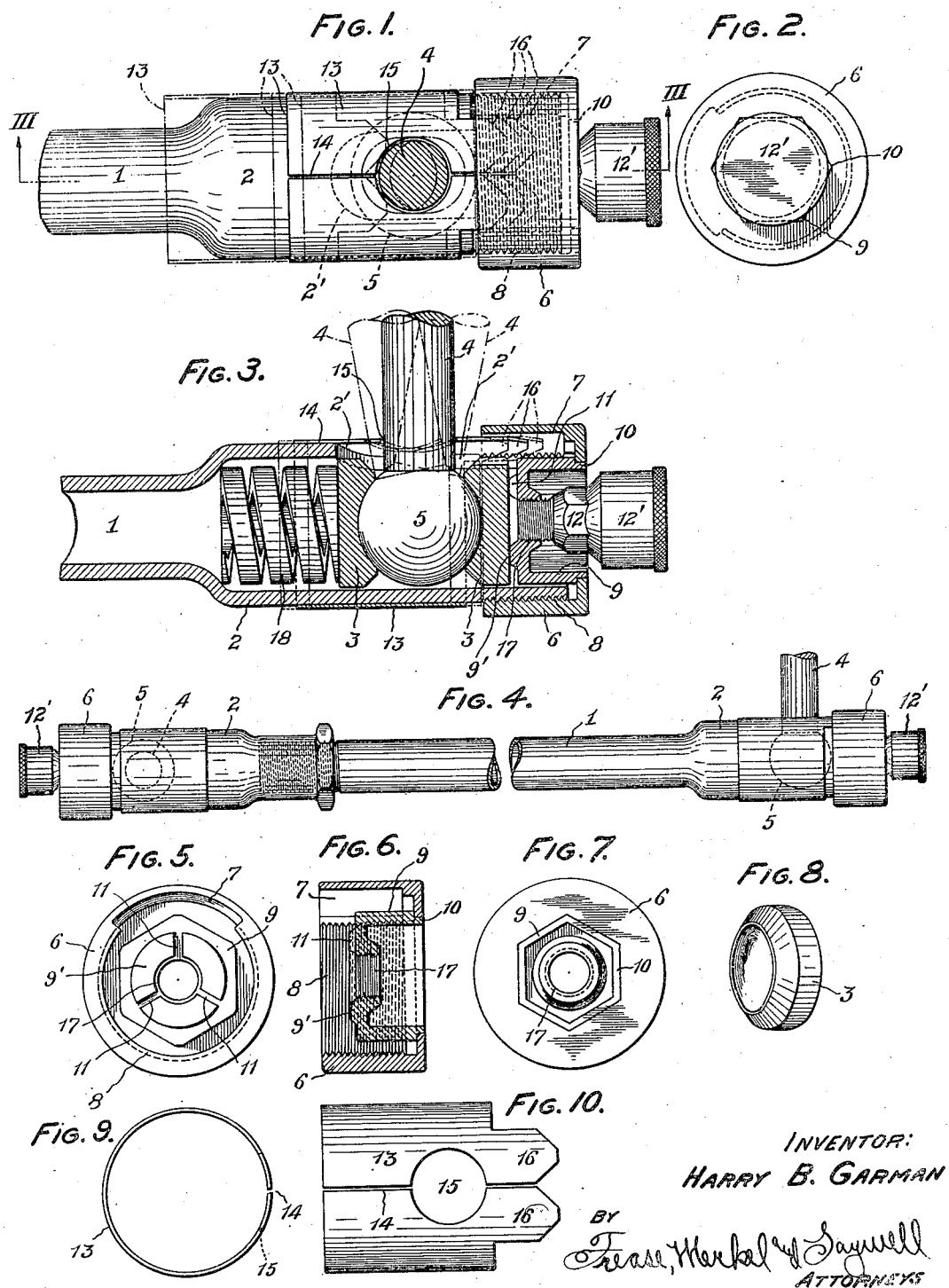
INVENTOR:
HARRY B. GARMAN

UNITED STATES PATENT OFFICE.

HARRY B. GARMAN, OF DETROIT, MICHIGAN, ASSIGNOR TO THE STEEL PRODUCTS COMPANY, OF CLEVELAND, OHIO, A CORPORATION OF OHIO.

DRAG LINK.

1,410,908.   Specification of Letters Patent.   Patented Mar. 28, 1922.

Application filed October 16, 1919. Serial No. 331,027.

*To all whom it may concern:*

Be it known that I, HARRY B. GARMAN, a citizen of the United States, resident of Detroit, county of Wayne, and State of Michigan, have invented new and useful Improvements in Drag Links, of which the following is a specification, the principle of the invention being herein explained and the best mode in which I have contemplated applying that principle, so as to distinguish it from other inventions.

My invention relates to drag links, and particularly to the end portions of such links which receive the shock-absorbing springs and in which are journaled the respective connecting members. More particularly, my invention relates to improved means for locking the respective members of the link against relative longitudinal movement.

The annexed drawing and the following description set forth in detail certain means embodying my invention, the disclosed means, however, constituting but one of the various mechanical forms in which the principle of the invention may be employed.

In said annexed drawing:

Figure 1 represents a plan view of one end portion of a drag link;

Figure 2 represents an end view;

Figure 3 represents a vertical longitudinal section, in the plane indicated by the line III—III, Figure 1;

Figure 4 represents, upon a reduced scale, a broken side elevation of an entire link;

Figure 5 represents an inside face view of an end cap;

Figure 6 represents a vertical longitudinal section thereof;

Figure 7 represents an outside face view of said cap;

Figure 8 represents a perspective of one of a pair of cylindrical bearing blocks;

Figure 9 represents an end view of a split sleeve of spring steel forming an element of my improved locking means; and Figure 10 represents a plan view of said sleeve.

Referring to the annexed drawing, I have indicated by the ordinal 1 the main member of a drag link within the respective enlarged tubular end portions 2 of which are received the connecting members 4 and the shock absorbing springs 18. The intermediate member 1 is also a tubular member, in the form of device shown. The enlarged end portion 2 provides an abutment for one end of the spring 18 and an abutment for the other end is provided by one of a pair of cylindrical bearing blocks 3. Within the spherical bearing surfaces of these blocks 3 is journaled the enlarged end portion 5 of the connecting member 4. One end of the intermediate tube 1 is shown to be integrally united with one of the enlarged end portions 2 and the other end of said tube 1 is shown to be detachably united to the other of said enlarged end portions 2. The enlarged journal portion 5 of the connecting member 4 is inserted within the end portion 2 by means of an elongated slot 2' formed in the member 2 and intersecting the outer end thereof. The stem 4 of the connecting member plays within said elongated slot 2' and the respective intermediate and end positions of said member 4 are shown in Figure 3.

The outer end of the member 2 is formed with an external screw thread and a cap 6 formed with an internal screw thread 8 is adapted to cooperate therewith. This cap 6, in combination with related elements, positions the connecting member 4. The threads of this cap 6 are discontinuous through part of the periphery of the cap, this result being effected by cutting away the threads and a portion of the cap wall adjacently below, so as to form the space 7 plainly shown in Figures 5 and 6. A forwardly extending portion of a lock 13 mounted upon the end portion 2, is adapted to project into this space 7 so as to prevent the relative movement of the member 2 and cap 6, thus forming an absolutely effective lock. I have shown this member 13 in the form of a sleeve of spring steel which is split by means of a slot 14 intersecting the wall thereof from end to end, said slot 14 also intersecting a hole 15 formed in said wall and adapted to accommodate the stem 4 of the connecting member, said slot 14 also intersecting the projecting portion of the sleeve so as to form a pair of extended fingers 16. The hole 15 is of substantially the same diameter as that of the member 4, so that the sleeve 13 is reciprocated upon the member 2 by the movements of the member 4 longitudinally of the member 2, but the arrangement is such that the extreme rear position of the member 4, shown by the left hand dotted lines in Figure 3, will not entirely withdraw the projecting fingers 16 from the pathway of the threads of the cap 6, so that said fingers form a lock in all positions of the sleeve 13. The members 2 and 6 are positioned before the sleeve 13 is slipped over the member 4, this latter connection being made possible by the fact that the sleeve is of split formation, the resiliency of the sleeve closing the same up tightly around the member 4 after the stress has been removed therefrom. While the members 2 and 6 are being positioned, the sleeve is contained loosely upon the members 1 and 2, substantially as shown by the dotted line position thereof in Figure 1. It is evident that the construction shown and described provides a lock which is very efficient in action and which can be both positioned and removed very readily.

I provide means for lubricating the link and the same consists of the following detail. The outer face of the cap 6 is formed with a hole hexagonal in cross-section, and driven therein so as to form a tight fit in the shoulder 10 of an abutment member 9. The base portion of this abutment member 9 is formed with a threaded hole 17 adapted to cooperate with a threaded end portion of the cup 12 of an oil duct for which an internally threaded cap 12' is provided, the whole forming an oil cup of standard construction. The inner face of the abutment member 9 is formed with a raised shoulder 9' intersected by a plurality of oil passages 11.

What I claim is:

1. In a drag link, the combination of a tubular member; a connecting member journaled therein; a cap screw-threaded to one end of said tubular member; means cooperating with said cap for positioning the connecting member; and means movably supported upon said tubular member and provided with an extended finger intersecting the path of the threaded surface of said cap, screw-threads of the cap being broken away to provide an entrance for the finger, said last-mentioned means being movably dependent upon said connecting member.

2. In a drag link, the combination of a tubular member; a connecting member journaled therein; a cap screw-threaded to one end of said tubular member and provided with means for positioning the connecting member; means supported upon said tubular member and provided with an extended finger intersecting the path of the threaded surface of said cap, screw threads of the cap being broken away to provide an entrance for the finger; and means for preventing relative transverse movement of said tubular member and said last-mentioned means.

3. In a drag link, the combination of a tubular member; a connecting member journaled therein; a cap externally screw-threaded to one end of said tubular member and provided with means for positioning the connecting member, the threads of said cap being broken away so as to be discontinuous through part of the periphery of the cap; a sleeve mounted upon said tubular member and provided with an extended finger projecting into the space created by the discontinuity of the cap screw threads; and means for preventing relative transverse movement of said tubular member and said last-mentioned means.

4. In a drag link, the combination of a tubular member; a connecting member journaled therein; a cap externally screw-threaded to one end of said tubular member, and provided with means for positioning the connecting member, the threads of said cap being broken away so as to be discontinuous through part of the periphery of the cap; and a split sleeve of spring steel mounted upon said tubular member, intersected by said connecting member so as to be reciprocated longitudinally by the movements of the latter, and provided with an extended portion projecting into the space created by the discontinuity of the cap screw threads.

5. In a drag link, the combination of a tubular member; a pair of bearing blocks disposed therein; a spring disposed between one bearing block and an abutment created by a shoulder formed in the tubular member; a connecting member journaled between said bearing blocks, said tubular member being formed with an elongated recess intersecting one end thereof and within which said connecting member plays, said end of said tubular member being formed with external screw threads; a cap formed with internal screw threads adapted to cooperate with the aforesaid screw threads, and provided with means for positioning the connecting member, said cap threads being broken away so as to be discontinuous through part of the periphery of the cap; and a sleeve mounted upon said tubular member intersected by said connecting member and held against transverse movement relative to said tubular member and said connecting member, said sleeve being provided with an extended finger projecting into the space created by the discontinuity of the cap screw threads.

6. In a drag link, the combination of a tubular member; a pair of bearing blocks disposed therein; a spring disposed between one bearing block and an abutment created by a shoulder formed in the tubular member; a connecting member journaled between said bearing blocks, said tubular member being formed with an elongated recess intersecting one end thereof and within which said connecting member plays, said end of said tubular member being formed with external screw threads; a cap formed with internal screw threads adapted to cooperate with the aforesaid screw threads, said cap being provided with an inwardly extending abutment member adapted to be brought into contact with one of said bearing blocks, said cap threads being broken away so as to be discontinuous through part of the periphery of the cap; means mounted upon said tubular member, and provided with an extended portion projecting into the space created by the discontinuity of the cap screw threads; and means for preventing relative transverse movement of said tubular member and said last-mentioned means.

Signed by me this 19th day of Sept., 1919.

HARRY B. GARMAN.